Figure 1:
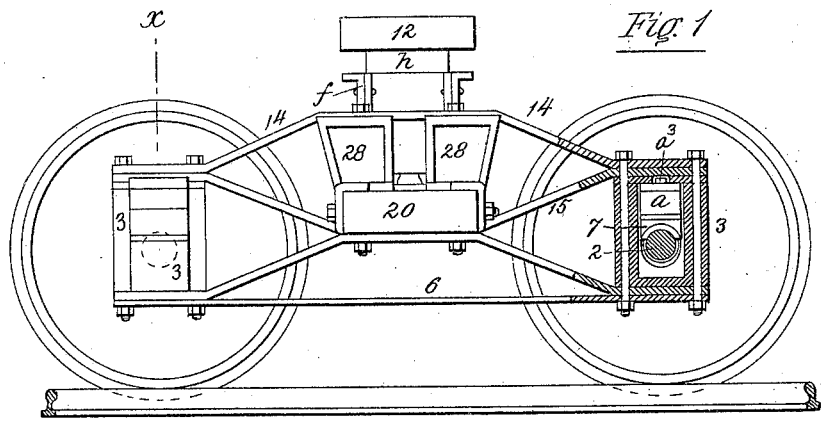

(No Model.)  2 Sheets—Sheet 1.

A. SHEDLOCK.
CAR TRUCK.

No. 309,657. Patented Dec. 23, 1884.

Witnesses
H. D. Williams
C. A. Maxfield

Inventor
Alfred Shedlock (No Model.) 2 Sheets—Sheet 2.

A. SHEDLOCK.
CAR TRUCK.

No. 309,657. Patented Dec. 23, 1884.

Witnesses.
H. D. Williams
C. A. Maxfield

Inventor.
Alfred Shedlock

UNITED STATES PATENT OFFICE.

ALFRED SHEDLOCK, OF JERSEY CITY, NEW JERSEY, ASSIGNOR TO WILLIAM H. H. SISUM, OF BROOKLYN, NEW YORK.

CAR-TRUCK.

SPECIFICATION forming part of Letters Patent No. 309,657, dated December 23, 1884.

Application filed September 5, 1884. (No model.)

*To all whom it may concern:*

Be it known that I, ALFRED SHEDLOCK, a citizen of the United States, and a resident of Jersey City, Hudson county, State of New Jersey, have invented certain new and useful Improvements in Car-Trucks, of which the following is a specification.

This invention relates to certain improvements in that class of car-trucks having articulated connections between the axles and truck-frame, and between the truck and car-body, and it embraces the application of supporting-rockers to such connections.

The invention consists of the combination, with each of the axle-bearings, which are free to move transversely in relation to the car-body and the truck-frame, of a supporting-piece adapted to rock on the top of its axle-bearing and support the truck on a rolling surface, the radii of which surface, taking the center of motion of the rocker on the bearing as a center, increase from the middle of said surface to its ends, so that the load thereon always tends to retain the center line of each of said supporting-rockers in a vertical position. All lateral forces—as those acting when the car is moving around a curve, &c.— will throw the supporting-rockers out of their vertical positions, but at the expense of overcoming gravity acting on the truck and car-body. The vertical rise of truck and car-body being equal to the difference between the radii of the central parts of the rockers and those of the parts of their surfaces upon which the truck now rests, lateral movements of the truck on the axles are opposed by the weight of the truck and load carried. Supporting-rockers of similar construction are arranged between the truck and the car-body, to work in conjunction with a fixed pin or roller on one of them, fitted to slide and rotate in a groove on the other, arranged longitudinally in relation to the car-body, so that the truck is free to swivel under the car-body and move longitudinally in relation thereto, and both of said movements, whether occurring separately or together, are opposed by the weight of the car-body and load carried. It is evident that these supporting-rockers, as applied to car-trucks, and the surfaces upon which they roll, which need not necessarily be flat, may be so shaped as to lift the truck or car-body, or both, any desired distance or distances, in any progressive manner, for the different angular positions assumed by them—that is to say, they can be so formed as to raise the load supported by them in proportion to the versed sines of the angles they take, in a manner similar to that due to the action of a suspension-link, or in any other desired manner; or they may be so formed that the load will be lifted when they move in one direction and not lifted when they move in the opposite direction.

Figure 5:
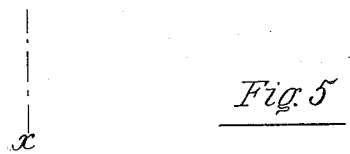
Figure 6:
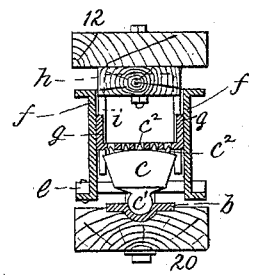
Figure 2:
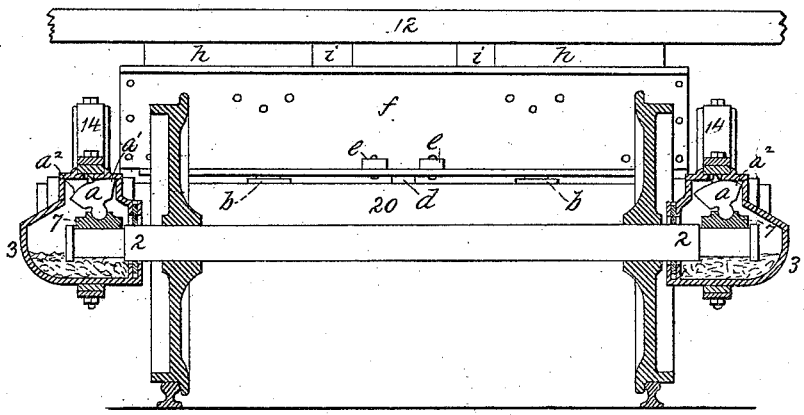
Figure 3:
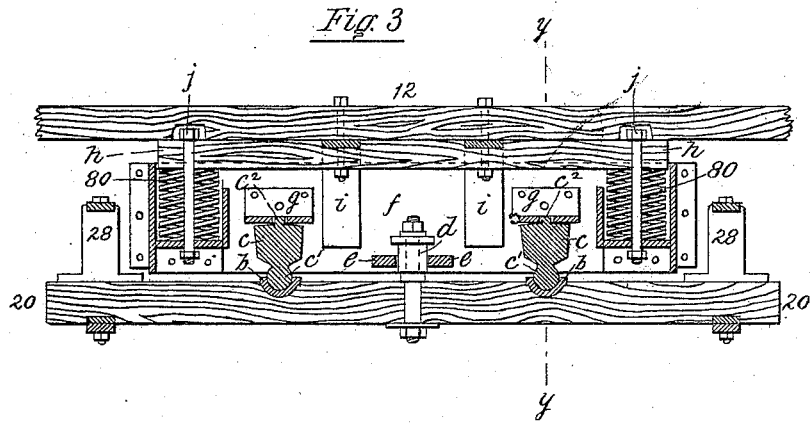
Figure 4:
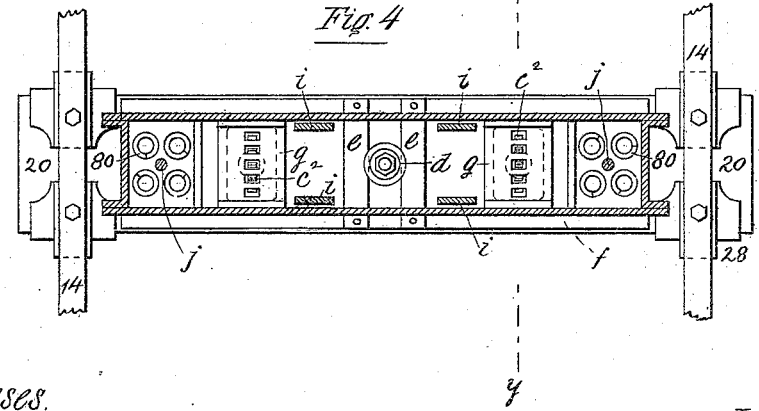

In the accompanying drawings, forming part of this specification, to which I will now refer, Figure 1, Sheet 1, is a side elevation of a car-truck embodying my improvements, showing one of the axle-boxes in section. Fig. 2, Sheet 2, is a section of one of the axles and boxes on the line $x\,x$, Fig. 1. Fig. 3, Sheet 2, is a sectional view of the truck transom and body connections. Fig. 4, Sheet 2, is a plan of the same with the body-bolster removed. Fig. 5, Sheet 1, is a section on the line $y\,y$, Figs. 3 and 4. Fig. 6, Sheet 1, is an enlarged view of one of the axle-journals and box, and Fig. 7, Sheet 1, is a similar view showing a modification of the supporting-rocker.

The car-truck shown, to which my improvements are applied, is of the diamond-pattern construction. The side frames, composed of the pieces 6 14 15 28, are rigidly connected at their centers to the ends of the transom 20, and at their ends to the journal-boxes 3 3. The journal-boxes 3 3 are made higher than ordinarily for the reception of the supporting-rockers *a a*, which are placed between the under sides of the tops of the boxes and the upper sides of the journal-bearings 7 7. These supporting-rockers *a a* take the place of the ordinary journal-bearing keys. They are fitted to rock on the tops of the journal-bearings 7 7 at their central parts by having formed on them a cylindrical bearing, which works in a corresponding transverse groove in the journal-bearings; or the cylindrical bearings may be formed on the tops of the journal-bearings and the corresponding grooves formed in the supporting-rockers. The journal-bearings 7 7, with the axles 2, are adapted to slide longitudinally in the boxes 3 3, and in so doing it will be observed that the boxes 3 3 are raised, due to the cam-shaped surfaces $a'$ of the rockers $a$ $a$, in contact with the tops of the boxes 3 3. These rockers $a$ $a$ have the halves of their rolling surfaces $a'$ $a'$, which are toward the center of the truck, cam-shaped when it is desired that the side of the car in the direction of its lateral movement only shall be raised, the outer halves, $a^2$ $a^2$, of the rockers then having a cylindrical form, as shown at Fig. 2.

Figure 7:
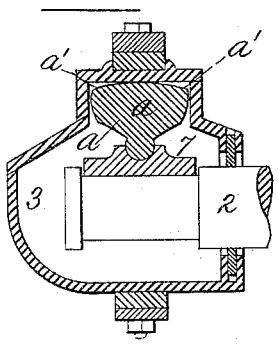

Fig. 6 is an enlarged view of one of the journal-bearings and its connection so made, and this view also more clearly shows the construction of the central tooth, $a^3$, on the top of the rocker $a$, fitting into a recess in the top of the box 3, its function being to hold the rolling surface of the rocker centrally, and to cause it to roll freely over the under side of the top of the box with the least amount of friction. This rolling surface of the rocker $a$ may be controlled and its proper action insured by making its ends round, so as to fit against the front and back of the box 3, as shown at Fig. 7; but a certain rubbing action will occur at these rounded ends as the rocker operates. This view also shows the rocker $a$ with its rolling surface $a'$ cam-shaped on both sides of the center line, by which form the box is raised when moved in either direction relatively to the axle 2. In the application of this supporting-rocker principle as a swiveling device between the truck and car-body, rockers constructed substantially as before described may be substituted for the ordinary body and truck side bearings. They are shown in the drawings as having bearings in the plates $b$ $b$, secured to the transom 20, the lower ends, $c'$ $c'$, of the rockers $c$ $c$ being spherical, and their upper surfaces cam-shaped in a longitudinal direction, and also somewhat rounded transversely, which form allows of their proper action when the truck swivels centrally under the car-body, or moves longitudinally in relation thereto, or when it is under a combination of the two movements, the body of the car being raised at all times when the rockers $c$ $c$ are caused to assume inclined positions. To control these actions and combination of actions on the part of the rockers $c$ $c$, a stud, $d$, is fixed in the center of the transom 20, which plays between the guides $e$ $e$, secured to the spring-box or hollow bolster $f$. The cam-shaped surfaces of the rockers $c$ $c$ have bearings on the under sides of the plates $g$ $g$, which are rigidly secured to or form part of the bolster $f$, and to insure a proper rolling action between them teeth $c^2$ $c^2$ are formed on the rockers and mesh into openings formed in the plates $g$ $g$. The hollow bolster $f$ is firmly connected to the body-bolster 12 of the car-body, so as to have only vertical play in relation thereto, by means of the plank or auxiliary bolster $h$, which is rigidly secured to the bolster 12, and carries guides $i$ $i$, which fit against the inner sides of the hollow bolster $f$. This plank $h$ rests on two nests of springs, 80 80, which have their seats in pockets formed at the ends of the hollow bolster $f$, and the parts are held together by the bolts $j$ $j$, passed through the nests of springs.

From the foregoing description of the construction of the said improvements in car-trucks it is evident that the supporting-rockers are normally held vertically by the load sustained by them, and that any deviation from such vertical positions, due to any shocks imparted to the car, or from other causes when the car is in motion, lifts the load supported by the rockers to any predetermined height in relation to the angle assumed by them, according to the form given their rolling surfaces.

Having now described my invention, what I claim, and desire to secure by Letters Patent, is—

1. The combination of supporting-rockers with each of the axle-bearings of a car-truck, located between said bearings and the truck-frame, whereby the truck is raised by lateral movements of the axles relatively to the truck-frame, substantially as set forth.

2. The combination, with a truck-frame in which the journal-boxes are rigidly secured thereto, of axles and journal-bearings adapted to slide in the journal-boxes, and supporting-rockers placed between the journal-bearings and the tops of the boxes, fitted to rock on the journal-bearings and roll on the under side of the tops of the boxes, substantially as and for the purpose set forth.

3. In a car-truck, in combination, an axle with journal-bearings on its ends and supporting-rockers fitted to rock on the tops of the journal-bearings, and having rolling surfaces on their upper sides on which the truck rests, the inner halves of which are cam-shaped and the outer halves cylindrical, substantially as and for the purpose set forth.

4. The combination, with a sliding stud-connection between the truck and car-body, whereby the truck is free to move longitudinally under the car-body, but has no lateral movement relatively thereto, of two supporting-rockers having spherical bearings on the transom, and cam-shaped bearings upon which the car-body rests, and by which the car-body is raised when the truck moves longitudinally thereto or swivels thereunder, substantially as set forth.

5. In a car-truck, in combination, axles and journal-bearings adapted to move transversely in relation to the truck-frame, supporting-rockers located between the truck-frame and the journal-bearings, a central stud secured to the truck-frame and fitted to work between longitudinal guides attached to or carried by the car-body, and two supporting-rockers located between the car-body and truck-frame, and on which the car-body rests, substantially as set forth.

6. In combination, the axle 2, journal-bearings 7, supporting-rocker $a$, having the guide-tooth $a^3$, and journal-box 3, having a recess in its top for the reception of the guide-tooth $a^3$, substantially as and for the purpose set forth.

7. In combination, the axle 2, journal-bearings 7 7, journal-boxes 3 3, and supporting-rockers $a\ a$, having half of their bearing-surfaces $a'\ a'$ cam-shaped and the other half, $a^2\ a^2$, cylindrical, substantially as and for the purpose set forth.

8. In combination, the central stud, $d$, the longitudinal guide-bearings $e\ e$, the two supporting-rockers $c\ c$, having spherical bearings $c'\ c'$ and cam-shaped rolling surfaces, the transom 20 of the truck, and the bolster $f$ attached to the car-body and having the bearing-plates $g\ g$, by which it and the car-body are supported on the cam-shaped surfaces of the rockers $c\ c$, substantially as and for the purpose set forth.

9. The swiveling and longitudinally-moving connection of a car-truck and car-body, comprising the stud $d$, the longitudinal guides $e\ e$, the supporting-rockers $c\ c$, and their bearings, in combination with the laterally-moving axle-connections, comprising the journal-bearings 7 7, the supporting-rockers $a\ a$, and the journal-boxes 3 3, substantially as set forth.

In witness whereof I have hereunto set my hand this 4th day of September, A. D. 1884.

ALFRED SHEDLOCK.

Witnesses:
H. D. WILLIAMS,
C. A. MAXFIELD.